Figure 1:
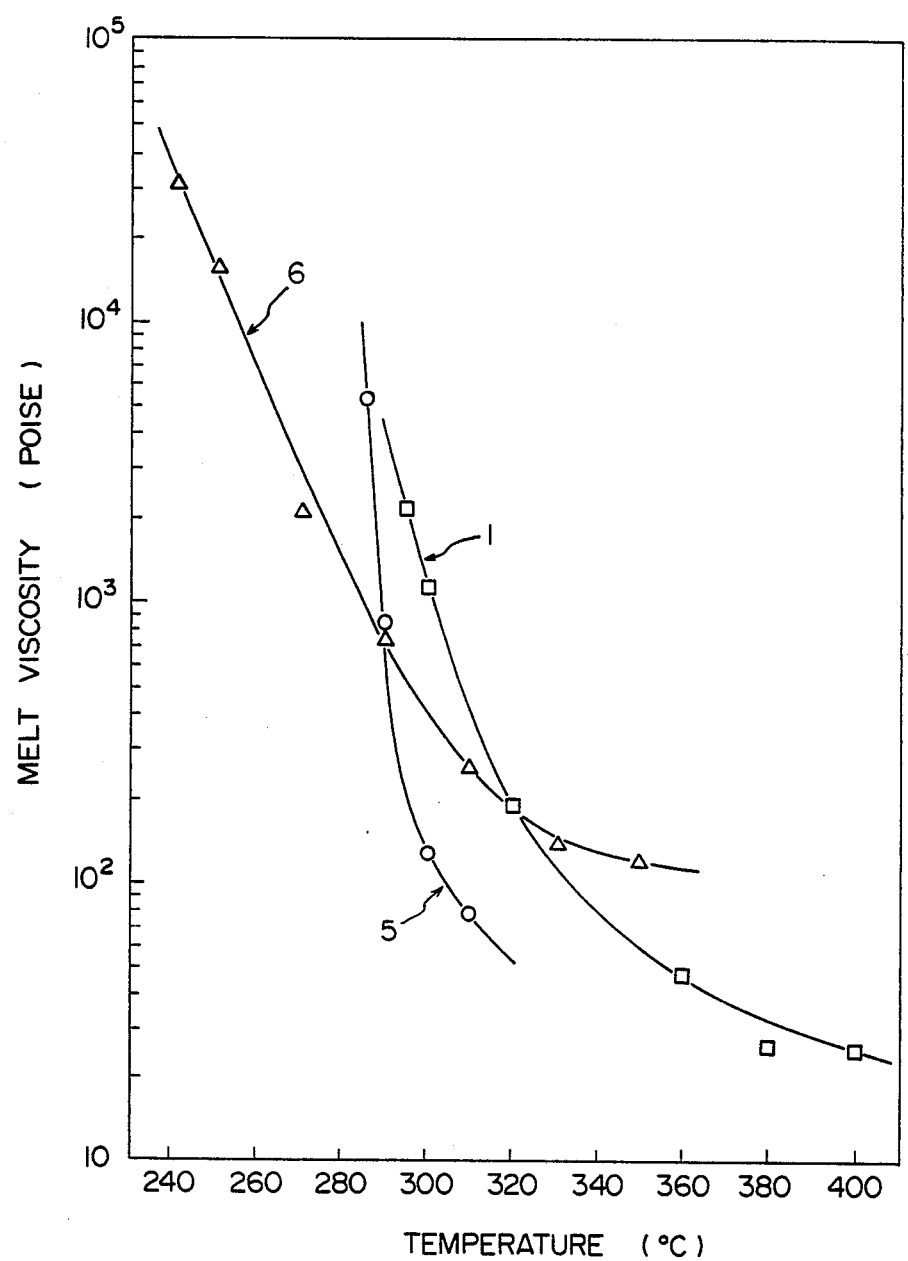

United States Patent [19]

Ueno et al.

[11] Patent Number: 4,746,721
[45] Date of Patent: May 24, 1988

[54] COPOLYESTER

[75] Inventors: Ryuzo Ueno, Nishinomiya; Yoshiyasu Masada, Hirakata; Taihei Hamasaki, Itami; Toru Mori, Takarazuka, all of Japan

[73] Assignee: Kabushiki Kaisha Ueno Seiyaku Oyo Kenkyujo, Osaka, Japan

[21] Appl. No.: 893,206

[22] Filed: Aug. 5, 1986

[30] Foreign Application Priority Data

Aug. 13, 1985 [JP] Japan .................. 60-176902
Jan. 17, 1986 [JP] Japan .................. 61-6483
Jan. 17, 1986 [JP] Japan .................. 61-6484

[51] Int. Cl.$^4$ .................................... C08G 63/02
[52] U.S. Cl. ............................... 528/191; 528/171; 528/176; 528/190; 528/193; 528/194
[58] Field of Search ............... 528/176, 190, 191, 193, 528/194, 171

[56] References Cited

U.S. PATENT DOCUMENTS 4,605,727  8/1986  Inoue et al. .................. 528/191

Primary Examiner—Lucille M. Phynes
Attorney, Agent, or Firm—Sherman and Shalloway

[57] ABSTRACT

A melt-processable copolyester composed of the following structural units (I), (II) and (III) and/or (IV) as main structural components, wherein
unit (I) is represented by the formula

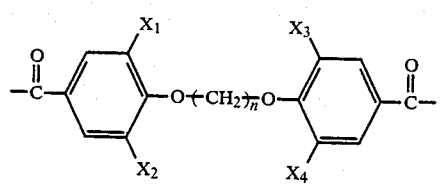

wherein $X_1$, $X_2$, $X_3$ and $X_4$, independently from each other, represent H, F, Cl, Br, CH$_3$ or C(CH$_3$)$_3$, provided that $X_1$ to $X_4$ do not simultaneously represent H, and n is 2 or 4,
unit (II) is at least one unit selected from the group consisting of

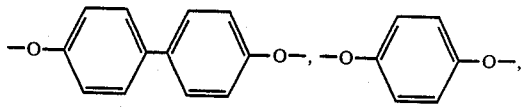

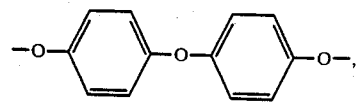

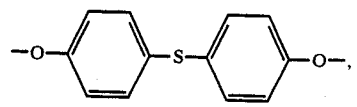

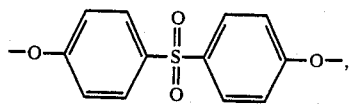

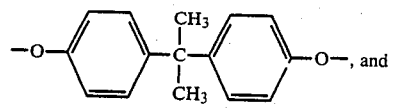

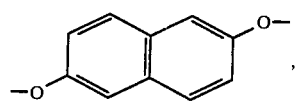

unit (III) is 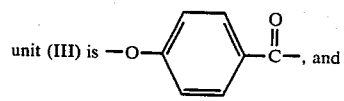 , and unit (IV) is (Abstract continued on next page.)

wherein at least one of the hydrogen atoms in each aromatic ring in units (II), (III) and (IV) may be substituted by an alkyl or alkoxy group having 1 to 4 carbon atoms or a halogen atom.

The proportion of unit (I) is 2.5 to 35 mole %, the proportion of unit (II) is 2.5 to 35 mole %, and the proportion of unit (III), (IV) or a combination of units (III) and (IV) is 30 to 95 mole %.

16 Claims, 1 Drawing Sheet

COPOLYESTER

This invention relates to a melt-processable copolyester having improved mechanical properties, especially flexural properties.

It is known that a group of aromatic polyesters which show liquid crystallinity when melted have a high degree of orientation and accordingly show excellent mechanical properties, particularly high tensile strength. On the other hand, since there is a very large difference between their mechanical properties in the direction of the axis of orientation and those in a direction perpendicular to it, their properties depend greatly upon their flowing state during melt processing. Hence, their industrial application encounters difficulties.

Those which have been put to industrial application contain fillers in order to decrease high orientation, and do not prove to be satisfactory because the light weight of the resin material is greatly sacrificed and their specific strength decreases.

For example, as shown in U.S. Pat. No. 4,473,682, a resin formed from 5 mole% of 6-acetoxy-2-naphthoic acid, 60 mole% of p-hydroxybenzoic acid, 17.5 mole% of 4,4'-biphenol diacetate and 17.5 mole% of terephthalic acid has a tensile strength of 1900 kg/cm² but a flexural strength of 1230 kg/cm² and a flexural modulus of $8.4 \times 10^4$ kg/cm².

Starting monomers for aromatic polyesters are frequently crystalline, and the melt-polymerization conditions are naturally restricted by the melting points of the monomers and the resulting polymer. Furthermore, the restriction of the melting point of the polymer in turn imposes restrictions on the monomer composition which can be melt-polymerized.

Polymers containing component (I) in this invention are described, for example, in Japanese Laid-Open Patent Publications Nos. 41331/1984 and 4529/1985. Polymers containing components (III) and (IV) in this invention are described, for example, in U.S. Pat. No. 4,161,470, No. EP-A-2,119,465, U.S. Pat. No. 4,219,461, No. EP-A-1,102,160, and U.S. Pat. No. 4,473,682.

A homopolymer of p-hydroxybenzoic acid, known as "EKONOL E101", has a very high melting point and cannot be melt-polymerized. Its processability can be increased by using 6-acetoxy-2-naphthoic acid as a copolymer component (U.S. Pat. No. 4,161,470). Further work on its improvement has been done, but no significant improvement in mechanical strength, particularly flexural strength has been achieved (U.S. Pat. No. 4,161,470 and No. EP-A-2,119,465).

It was recently reported that polymers containing 1,2-bis(2-chlorophenoxy)ethane-4,4'-dicarboxylic acid as a copolymer component are tough (Japanese Laid-Open Patent Publication No. 4529/1985). Since, however, these polymers generally have a fairly low melting point because they contain an aliphatic component in the main chain, they have only limited uses in practical application.

The resins shown in Japanese Laid-Open Patent Publication No. 41331/1984 are wholly aromatic polyesters. A polymer derived from 1,2-bis(2-chlorophenoxy)ethane-4,4'-dicarboxylic acid and 4,4'-diacetoxybiphenol, which is stated to be most preferred, has a high melting point, and is very difficult to prepare by melt-polymerization.

It is an object of this invention therefore to remedy the aforesaid defects of the conventional polyesters, and to provide copolyesters which can be prepared by melt polymerization and can be melt-processed, have moderately high heat distortion temperatures and melting points and which give shaped articles having high strengths and high moduli.

According to this invention, this object is achieved by a copolyester composed of the following structural units (I), (II) and (III) and/or (IV) as main structural components.

STRUCTURAL UNIT (I)

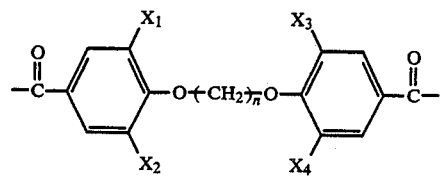

In the formula, $X_1$, $X_2$, $X_3$ and $X_4$, independently from each other, represent H, F, Cl, Br, CH₃ or C(CH₃)₃, provided that $X_1$ to $X_4$ do not simultaneously represent H, and n is 2 or 4.

STRUCTURAL UNIT (II)

At least one unit selected from the group consisting of

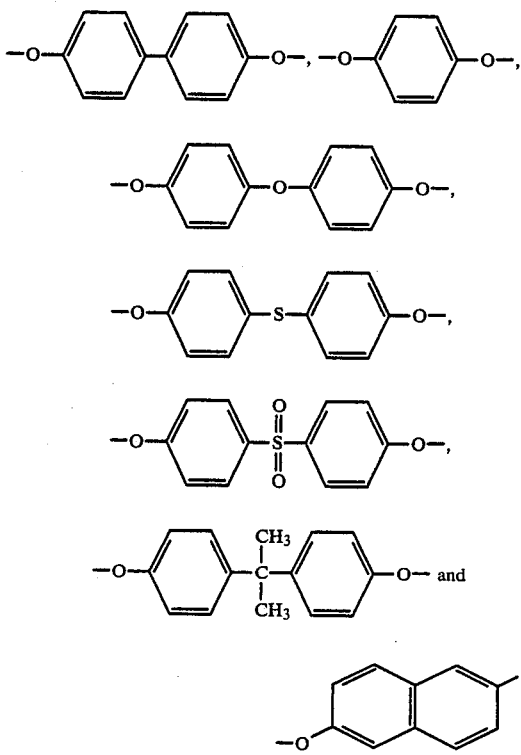

STRUCTURAL UNIT (III)

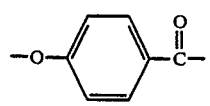

STRUCTURAL UNIT (IV)

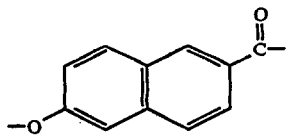

In the structural units (II), (III) and (Iv), at least one of the hydrogen atoms on each aromatic ring may be substituted by an alkyl or alkoxy group having 1 to 4 carbon atoms or a halogen atom.

The copolyester of this invention should contain 2.5 to 35 mole%, preferably 5 to 30 mole%, more preferably 10 to 25 mole%, of unit (I), 2.5 to 35 mole%, preferably 5 to 30 mole%, more preferably 10 to 25 mole%, of unit (II), and 30 to 95 mole%, preferably 40 to 90 mole%, more preferably 50 to 80 mole%, of unit (III), or unit (IV) or a combination of units (III) and (IV). If the total proportion of the units (I) and (II) exceeds 70 mole % based on the copolyester, the copolyester has a high melting point and is extremely difficult to prepare by melt-polymerization. At least one of the units (III) and (IV) should be present, but preferably both units are present.

The ease of shaping a resin does not necessarily depends upon the melting point of the resin. The copolyester of this invention can be melt-shaped. It attains a melt viscosity of $10^4$ to $10^2$ poises at temperatures of not more than 400° C., preferably not more than 360° C., more preferably not more than 320° C., but cannot attain this melt viscosity range at temperatures of not more than 180° C. The polymerization temperature for the preparation of the copolyester of this invention is not more than 360° C., preferably not more than 340° C., and more preferably not more than 320° C.

When the copolyester of this invention is prepared at a polymerization temperature exceeding 360° C., it is undesirably colored and undergoes decomposition resulting in the liberation of the halogen atoms in unit (I).

When substituents exist on the structural units of the copolyester of this invention, its melting point generally becomes broad and vague. But its glass transition temperature, as a measure of heat resistance is equivalent to that of the non-substituted copolyester, and the copolyester shows high mechanical properties.

Preferred starting compounds which provide the unit (I) of the copolyester of the invention include, for example,
1,2-bis(2-chlorophenoxy)ethane-4,4'-dicarboxylic acid,
1,2-bis(2-bromophenoxy)ethane-4,4'-dicarboxylic acid,
1,2-bis(2-fluorophenoxy)ethane-4,4'-dicarboxylic acid,
1,2-bis(2-methylphenoxy)ethane-4,4'-dicarboxylic acid,
1,2-bis(2,6-dimethylphenoxy)ethane-4,4'-dicarboxylic acid,
1,2-bis(2-tert-butylphenoxy)ethane-4,4'-dicarboxylic acid,
1,2-bis(2,6-di-tert-butylphenoxy)ethane-4,4'-dicarboxylic acid,
1,4-bis(2-chlorophenoxy)butane-4,4'-dicarboxylic acid,
1,4-bis(2-bromophenoxy)butane-4,4'-dicarboxylic acid,
1,4-bis(2-fluorophenoxy)butane-4,4'-dicarboxylic acid,
1,4-bis(2-methylphenoxy)butane-4,4'-dicarboxylic acid,
1,4-bis(2,6-dimethylphenoxy)butane-4,4'-dicarboxylic acid,
1,4-bis(2-tert-butylphenoxy)butane-4,4'-dicarboxylic acid,
1,4-bis(2,6-di-tert.-butylphenoxy)butane-4,4'-dicarboxylic acid, and their esters (e.g., methyl or phenyl) and chlorides.

The following compounds may also be used in small amounts which do not impair the properties of the resulting copolyester of this invention.
1(2-Chlorophenoxy)-2(2',6'-dichlorophenoxy)ethane-4,4'-dicarboxylic acid,
1(2-chlorophenoxy)-2(2',3',6'-trichlorophenoxy)ethane-4,4'-dicarboxylic acid,
1,2-bis(2,6-dichlorophenoxy)ethane-4,4'-dicarboxylic acid,
1(2,6-dichlorophenoxy)-2(2',3',6'-trichlorophenoxy)ethane-4,4'-dicarboxylic acid,
1(phenoxy)-2(2'-chlorophenoxy)ethane-4,4'-dicarboxylic acid,
1(2-bromophenoxy)-2(2',5'-dibromophenoxy)ethane-4,4'-dicarboxylic acid,
1(2-bromophenoxy)-2(2',3',6'-tribromophenoxy)ethane-4,4'-dicarboxylic acid,
1,2-bis(2,6-dibromophenoxy)ethane-4,4'-dicarboxylic acid,
1(2,6-dibromophenoxy)-2(2',3',6'-tribromophenoxy)ethane-4,4'-dicarboxylic acid,
1(phenoxy)-2(2'-bromophenoxy)ethane-4,4'-dicarboxylic acid,
1(2-fluorophenoxy)-2(2',6'-difluorophenoxy)ethane-4,4'-dicarboxylic acid,
1(2-fluorophenoxy)-2(2',3',6'-trifluorophenoxy)ethane-4,4'-dicarboxylic acid,
1,2-bis(2,6-difluorophenoxy)ethane-4,4'-dicarboxylic acid,
1(2,6-difluorophenoxy)-2(2',3',6'-trifluorophenoxy)ethane-4,4'-dicarboxylic acid,
1(phenoxy)-2(2'-fluorophenoxy)ethane-4,4'-dicarboxylic acid,
1(2-chlorophenoxy)-4(2',6'-dichlorophenoxy)butane-4,4'-dicarboxylic acid,
1(2-chlorophenoxy)-4(2',3',6'-trichlorophenoxy)butane-4,4'-dicarboxylic acid,
1,4-bis(2,6-dichlorophenoxy)butane-4,4'-dicarboxylic acid,
1(2,6-dichlorophenoxy)-4(2',3',6'-trichlorophenoxy)butane-4,4'-dicarboxylic acid,
1(phenoxy-4(2'-chlorophenoxy)butane-4,4'-dicarboxylic acid,
1(2-bromophenoxy)-4(2',6'-dibromophenoxy)butane-4,4'-dicarboxylic acid,
1(2-bromophenoxy)-4(2',3',6'-tribromophenoxy)butane-4,4'-dicarboxylic acid,
1,4-bis(2,6-dibromophenoxy)butane-4,4'-dicarboxylic acid,
1(2,6-dibromophenoxy)-4(2',3',6'-tribromophenoxy)butane-4,4'-dicarboxylic acid,
1(phenoxy)-4(2'-bromophenoxy)butane-4,4'-dicarboxylic acid,
1(2-fluorophenoxy)-4(2',6'-difluorophenoxy)butane-4,4'-dicarboxylic acid,
1(2-fluorophenoxy)-4(2',3',6'-trifluorophenoxy)butane-4,4'-dicarboxylic acid,
1,4-bis(2,6-difluorophenoxy)butane-4,4'-dicarboxylic acid,
1(2,6-difluorophenoxy)-4(2',3',6'-trifluorophenoxy)butane-4,4'-dicarboxylic acid,
1(phenoxy)-4(2'-fluorophenoxy)butane-4,4'-dicarboxylic acid, and their esters (e.g., methyl or phenyl) and chlorides.

Starting compounds which provide the unit (II) are, for example, selected from biphenol, hydroquinone, 4,4'-hydroxydiphenol, 4,4'-thiodiphenol, 4,4'-sulfonyldiphenol, bisphenol A and 2,6-dihydroxynaphthalene. At least one of the hydrogen atoms on the aromatic rings of the diols may be substituted by an alkyl or alkoxy group having 1 to 4 carbon atoms or a halogen atom (F, Cl, Br or I).

Examples of substitution products of biphenol include
3-chloro-4,4'-biphenol,
2-chloro-4,4'-biphenol,
3,3'-dichloro-4,4'-biphenol,
2,2'-dichloro-4,4'-biphenol,
3,5-dichloro-4,4'-biphenol,
3,3',5-trichloro-4,4'-biphenol,
3,3',5,5'-tetrachloro-4,4'-biphenol,
2,3'-dichloro-4,4'-biphenol,
2,2',6,6'-tetrachloro-4,4'-biphenol,
3-bromo-4,4'-biphenol,
2-bromo-4,4'-biphenol,
3,3'-dibromo-4,4'-biphenol,
2,2'-dibromo-4,4'-biphenol,
3-methyl-4,4'-biphenol,
2-methyl-4,4'-biphenol,
3,3'-dimethyl-4,4'-biphenol,
2,2'-dimethyl-4,4'-biphenol,
3,3',5,5'-tetrabutyl-4,4'-biphenol,
3-methoxy-4,4'-biphenol,
2-methoxy-4,4'-biphenol, and
3,3'-dimethoxy-4,4'-biphenol.

Examples of substitution products of hydroquinone include
methylhydroquinone,
2,5-dimethylhydroquinone,
2,6-dimethylhydroquinone,
ethylhydroquinone,
methoxyhydroquinone,
2,5-dimethoxyhydroquinone,
chlorohydroquinone,
2,5-dichlorohydroquinone,
2,6-dichlorohydroquinone,
bromohydroquinone,
2,5-dibromohydroquinone,
2,6-dibromohydroquinone,
fluorohydroquinone, and
iodohydroquinone.

Examples of substitution products of 4,4'-oxydiphenol include
3-chloro-4,4'-oxydiphenol,
2-chloro-4,4'-oxydiphenol,
3,3'-dichloro-4,4'-oxydiphenol,
2,2'-dichloro-4,4'-oxydiphenol,
3,5-dichloro-4,4'-oxydiphenol,
2,3-dichloro-4,4'-oxydiphenol,
3,3',5-trichloro-4,4'-oxydiphenol,
3,3',5,5'-tetrachloro-4,4'-oxydiphenol,
2,2',6,6'-tetrachloro-4,4'-oxydiphenol,
3-bromo-4,4'-oxydiphenol,
2-bromo-4,4'-oxydiphenol,
3,3'-dibromo-4,4-oxydiphenol,
2,2'-dibromo-4,4'-oxydiphenol,
3,5-dibromo-4,4'-oxydiphenol,
3,3',5,5'-tetrabromo-4,4'-oxydiphenol,
3-methyl-4,4'-oxydiphenol,
2-methyl-4,4'-oxydiphenol,
3,3'-dimethyl-4,4'-oxydiphenol,
2,2'-dimethyl-4,4'-oxydiphenol,
3-methoxy-4,4'-oxydiphenol,
2-methoxy-4,4'-oxydiphenol, and
3,3-dimethoxy-4,4'-oxydiphenol.

Similar examples of substitution products to 4,4'-oxydiphenol may be cited for substitution products of 4,4'-thiodiphenol, 4,4'-sulfonyldiphenol and bisphenol A.

Examples of substitution products of 2,6-dihydroxynaphthalene include
1-chloro-2,6-dihydroxynaphthalene,
3-chloro-2,6-dihydroxynaphthalene,
4-chloro-2,6-dihydroxynaphthalene,
1,3-dichloro-2,6-dihydroxynaphthalene,
1,5-dichloro-2,6-dihydroxynaphthalene,
1,3,5,7-tetrachloro-2,6-dihydroxynaphthalene,
1-bromo-2,6-dihydroxynaphthalene,
3-bromo-2,5-dihydroxynaphthalene,
4-bromo-2,6-dihydroxynaphthalene,
1,5-dibromo-2,6-dihydroxynaphthalene,
1-methyl-2,6-dihydroxynaphthalene,
3-methyl-2,6-dihydroxynaphthalene,
4-methyl-2,6-dihydroxynaphthalene,
1,5-dimethyl-2,6-dihydroxynaphthalene,
1-methoxy-2,6-dihydroxynaphthalene,
3-methoxy-2,6-dihydroxynaphthalene,
4-methoxy-2,6-dihydroxynaphthalene, and
1,5-dimethoxy-2,6-dihydroxynaphthalene.

In addition, lower acyl esters, preferably acetates, of these exemplified compounds may be cited as compounds which provide the unit (II).

Examples of starting compounds which provide the unit (III) include
4-hydroxybenzoic acid,
3-chloro-4-hydroxybenzoic acid,
2-chloro-4-hydroxybenzoic acid,
3,5-dichloro-4-hydroxybenzoic acid,
3-bromo-4-hydroxybenzoic acid,
2-bromo-4-hydroxybenzoic acid,
3,5-dibromo-4-hydroxybenzoic acid,
3-methyl-4-hydroxybenzoic acid,
2-methyl-4-hydroxybenzoic acid,
3,5-dimethyl-4-hydroxybenzoic acid,
3-methoxy-4-hydroxybenzoic acid,
2-methoxy-4-hydroxybenzoic acid,
3,5-dimethoxy-4-hydroxybenzoic acid,
3-phenyl-4-hydroxybenzoic acid,
2-phenyl-4-hydroxybenzoic acid, and
lower acyl esters, preferably acetates, or lower alkyl esters, preferably methyl esters, of these acids.

Examples of starting compounds which provide the unit (IV) include
6-hydroxy-2-naphthoic acid,
5-chloro-6-hydroxy-2-naphthoic acid,
7-chloro-6-hydroxy-2-naphthoic acid,
1-chloro-6-hydroxy-2-naphthoic acid,
3-chloro-6-hydroxy-2-naphthoic acid,
5,7-dichloro-6-hydroxy-2-naphthoic acid,
1,5-dichloro-6-hydroxy-2-naphthoic acid,
1,5,7-trichloro-6-hydroxy-2-naphthoic acid,
5-bromo-6-hydroxy-2-naphthoic acid,
7-bromo-6-hydroxy-2-naphthoic acid,
1-bromo-6-hydroxy-2-naphthoic acid,
3-bromo-6-hydroxy-2-naphthoic acid,
5,7-dibromo-6-hydroxy-2-naphthoic acid,
1,5-dibromo-6-hydroxy-2-naphthoic acid,
1,5,7-tribromo-6-hydroxy-2-naphthoic acid,
5-methyl-6-hydroxy-2-naphthoic acid, 7-methyl-6-hydroxy-2-naphthoic acid,
5-methoxy-6-hydroxy-2-naphthoic acid,
7-methoxy-6-hydroxy-2-naphthoic acid, and
lower acyl esters, preferably acetates, or lower alkyl esters, preferably methyl esters, of these acids.

The copolyester of this invention can be obtained by any desired method using the aforesaid starting compounds, namely compounds having the structural unit (I), compounds having the structural unit (II), and compounds having the structural unit (III) and/or compounds having the structural unit (IV), for example by polycondensation of an aromatic diol, a phenyl ester of an aromatic hydroxycarboxylic acid, and a diphenyl ester of an aromatic dicarboxylic acid with elimination of phenol, or by first reacting a required amount of diphenyl carbonate with a mixture of an aromatic hydroxycarboxylic acid and an aromatic dicarboxylic acid to convert the carboxylic acids to their phenyl esters, then adding an aromatic diol, and subjecting the mixture to polycondensation with elimination of phenol. Preferably, it is obtained by polycondensation with elimination of monocarboxylic acid which comprises reacting an aromatic dicarboxylic acid with an acyloxy aromatic carboxylic acid and a diacyl aromatic diol. In this method, the polymerization may be carried out subsequent to acylation of the hydroxyl group with acetic anhydride, or the polymerization may be carried out by using an acylated monomer. Acetylated compound is the most preferred acylated monomer.

Preferably, the copolyester of this invention is obtained by the following two-step reaction. In a first stage reaction, de-acylation reaction is carried out in an atmosphere of an inert gas at a temperature of 140° to 320° C., especially 250° to 320° C. In a second-stage reaction, the polymer obtained by the first-stage reaction is heated at 290° to 320° C. under a vacuum of about 1 torr to otain a polymer having a higher degree of polymerization.

A catalyst may be used to obtain the desired inherent viscosity within a short period of time. Typical examples of the catalyst are dialkyltin oxides such as dibutyltin oxide, diaryltin oxides, titanium dioxide, titanium alkoxysilicates, titanium alkoxides, alkali or alkaline earth metal salts of carboxylic acids such as potassium acetate, sodium acetate and calcium acetate, and antimony trioxide. Sodium acetate and potassium acetate are most preferred. The amount of the catalyst added is 0.0001 to 1% by weight, preferably 0.01 to 0.2% by weight, based on the total weight of the monomers.

The inherent viscosity (IV) of the copolyester of the invention is defined by $$IV = \frac{\ln(\eta_{rel})}{c}$$

where c is the concentration (0.1% by weight) of a solution of the polymer, and $\eta_{rel}$ is the relative viscosity of the polymer.

The copolyester of this invention has an inherent viscosity, determined for a 0.1% by weight pentadifluorophenol solution of the polymer at 60° C. by a capillary viscometer, of 1.0 to 15, preferably 3.0 to 6.0. When the contents of the units (I) and (II) increase, the inherent viscosity of the copolyester decreases. If the inherent viscosity is less than 1.0, the copolyester does not show sufficient properties. As the contents of the units (III) and (IV) increase, the inherent viscosity increases, but when it exceeds 15, melt polymerization becomes very difficult.

The copolyester of this invention is very tough and shows a flexural modulus of at least $1 \times 10^5$ kg/cm$^2$ or values close to it and a heat distortion temperature of at least 120° C. or values close to it under a load of 18.6 kg/cm$^2$.

Generally, improving flexural properties requires a larger amount of reinforcing agents than improvement tensile properties, and consequently, the resulting shaped articles increase in weight and decrease in specific strength. The copolyesters of this invention have high flexural strength and an excellent modulus equivalent to conventional composites of engineering plastics, e.g. polycarbonates, polyamides or polyphenylene sulfide, in which about 40% fo glass fibers are incorporated, or a higher modulus. Generally, the heat resistance of a resin can be improved by adding a filler. The heat resistance of the resin over a long period of time is mostly dominated by the glass transition temperature of the resin itself. The copolyester of this invention has a glass transition temperature of about 120° C. or values close to it, which is very high among existing resins having improved flexural properties.

The copolyester of the invention has good melt processability because it has a melt viscosity of $10^4$ to $10^2$ poises at a temperature in the range of 180° to 400° C. It can be processed by usual melt shaping techniques such as extrusion, injection molding, compression molding and blow molding, and shaped articles composed of the resin alone which are comparable to conventional glass fiber-filled articles can be obtained.

The copolyester of the invention can also be shaped into fibers, films, three-dimensional articles, containers, hoses and pipes and structures produced by using these shaped articles.

Various desired properties may be imparted to shaped articles by adding various additives, for example reinforcing materials such as glass fibers, carbon fibers, asbestos fibers, organic fibers, ceramic fibers and short metallic fibers, fillers such as calcium carbonate and mica, nucleating agents, pigments, dyes, antioxidants, stabilizers, plasticizers, lubricants, mold releasing agents and fire retardants, and other thermoplastic resins to the aromatic copolyester of the invention at the time of shaping.

The following examples illustrate the present invention more specifically.

The various properties in these examples were evaluated by the following methods.

MELTING POINT AND GLASS TRANSITION POINT

Measured at a temperature elevating rate of 20° C./min. using a differential scanning calorimeter (DSC) [SSC/560, SSC/560S, made by Seiko Electronics Industry, Co., Ltd.].

INHERENT VISCOSITY

Determined in pentafluorophenol (60° C.) at a polymer concentration of 0.1% by weight.

TENSILE STRENGTH OF A SHAPED ARTICLE

Measured in accordance with ASTM D638, Type IV.

FLEXURAL STRENGTH OF A SHAPED ARTICLE

Measured in accordance with ASTM D790.

FLEXURAL MODULUS OF A SHAPED ARTICLE

Measured in accordance with ASTM D780.

HEAT DISTORTION TEMPERATURE OF A SHAPED ARTICLE

Measured under a load of 18.6 kg/cm² in accordance with ASTM D648.

IMPACT STRENGTH (NOTCHED) OF A SHAPED ARTICLE

Measured in accordance with ASTM D256.

The accompanying FIG. 1 is a graph showing the relation between the measured temperatures and the measured melt viscosities (poises) of the copolyesters obtained in Examples 1, 5 and 6. The numeral 1, 5 and 6 in the drawing represent the example numbers.

EXAMPLE 1

A 5-liter three-necked separable flask equipped with a stirrer, a distillate condensing device and a nitrogen gas introducing opening was charged with 667.8 g (1.8 moles) of 1,2-bis(2-chlorophenoxy)ethane-4,4'-dicarboxylic acid, 486.5 g (1.8 moles) of 4,4'-biphenol diacetate, 1025.5 g (4.455 moles) of 6-acetoxy-2-naphthoic acid and 170.3 g (0.945 mole) of p-acetoxybenzoic acid, and the inside of the flask was purged three times with nitrogen. In a stream of nitrogen, the mixture was polymerized at 250° C. for 3 hours. Then, the temperature was raised, and the mixture was further polymerized at 280° C. for 1.5 hours, at 300° C. for 1.5 hours, at 310° C. for 1 hour and at 320° C. for 1 hour.

The distillate obtained up to this time was analyzed by high-performance liquid chromatography. It was found that acetic acid distilled in an amount corresponding to 96.2% of theory.

Then, the pressure was gradually reduced by using a water flow pump and in about 1 hour, decreased to about 30 torr. The pump was switched over to a vacuum pump, and the polymerization was carried out under about 1 torr for 2 hours. The resulting polymer had an inherent viscosity of 3.2, and a melting point, measured by DSC, was 287° C.

The polymer showed optional anisotropy when observed under a polarizing microscope (Nikon PFX).

The resulting sample was molded into Dumbell test specimens, flexural test specimens, etc. by an injecting molding machine (PROMAT 165/75 made by Sumitomo Heavy Machinery Industry, Co., Ltd.) under the conditions shown in Table I, and the mechanical properties of the specimens were measured. As shown in Table I, the polymer showed high strength and high modulus.

TABLE I

| | |
|---|---|
| Cylinder temperature | |
| Rear portion | 265° C. |
| Middle portion | 280° C. |
| Front portion | 280° C. |
| Nozzle portion | 280° C. |
| Resin temperature (at the tip of the nozzle) | 300° C. |
| Mold temperature | 70° C. |
| Molding cycle | |
| Injection | 1.5 seconds |
| Pressure maintenance | 10 seconds |
| Cooling | 40 seconds |
| Rotating speed of the screw | 150 rpm |
| Injection pressure | 1,200 kg/cm² |
| Properties | |
| Tensile strength | 2,350 kg/cm² |
| Flexural strength | 2,890 kg/cm² |
| Flexural modulus | 1.9 × 10⁵ kg/cm² |
| Heat distortion temperature | 142° C. |
| Izod impact strength (notched) | 28 kg-cm/cm |

The resulting polymer was subjected to a Capillography PMD-C (made by Toyo Seiki Seisakusho), and spun at 300° C. using a spinneret with an orifice diameter of 0.5 mm and a length of 5 mm to form an undrawn yarn having a diameter of 0.25 mm. The dynamic modulus of this yarn, measured by a Dynamic Modulus Tester made by Toyo Seiki Seisakusho, was an high as 151 GPa.

The relation between the temperature and the melt viscosity of this polymer was determined by using a flow tester (CFT-500, a product of Shimazu Seisakusho) under the following measuring conditions.

Die diameter: 0.5 mm
Die length: 1.0 mm
Pre-heating time: 300 seconds
Load: 10 kg/cm².

The results are shown in FIG. 1.

EXAMPLE 2

A 5-liter three-necked flask equipped with a stirrer, a distillate condensing device and a nitrogen gas introducing opening was charged with 668.2 g (1.8 moles) of 1,2-bis(2-chlorophenoxy)ethane-4,4'-dicarboxylic acid, 374.8 g (1.8 moles) of methylhydroquinone diacetate, 932.3 g (4.05 moles) of 6-acetoxy-2-naphthoic acid, and 243.3 g (1.35 moles) of p-acetoxybenzoic acid, and the inside of the flask was purged three times with nitrogen. In a stream of nitrogen, the mixture was polymerized at 250° C. for 2 hours, and thereafter stepwise at 280°, 290°, 300°, and 310° C. for 1 hour at each of the temperatures.

The pressure was then gradually reduced by means of a water flow pump, and the polymerization was performed under 600 torr, 200 torr, 100 torr and 40 torr for 20 minutes under each of the pressures. Thereafter, the pump was switched over to a vacuum pump, and the polymerization was carried out at 320° C. under less than 1 torr for about 1 hour to give a pale brown lustrous polymer having an inherent viscosity of 3.0, a glass transition temperature of 126° C., and a melting point of 266° C.

The polymer was molded by an injection molding machine (PROMAT 165/75 made by Sumitomo Heavy Machinery Industry Co., Ltd.) into Dumbell specimens, flexural test specimens, etc., and their mechanical and thermal properties were measured. As shown below, it showed relatively high heat resistance, and high strength and modulus.

Tensile strength: 1,990 kg/cm²
Flexural strength: 2,590 kg/cm²
Flexural modulus: 1.5 × 10⁵ kg/cm²
Izod impact strength: 44.8 kg-cm/cm
Heat distortion temperature: 127.4° C.

EXAMPLES 3-6

The same reactor as in Example 1 was charged with 1,2-bis(2-chlorophenoxy)ethane-4,4'-dicarboxylic acid, 4,4'-biphenol diacetate, 6-acetoxy-2-naphthoic acid and p-acetoxybenzoic acid in the proportions indicated in Table II, and the mixture was subjected to polycondensation reaction under the same conditions as in Example 1.

TABLE II

| Example | 1,2-bis(2-chlorophenoxy-ethane-4,4'-dicarboxylic acid (moles) | 4,4'-biphenol diacetate (moles) | 6-acetoxy-2-naphthoic acid (moles) | p-acetoxy-benzoic acid (moles) |
|---|---|---|---|---|
| 3 | 1.8 | 1.8 | 3.456 | 1.944 |
| 4 | 1.8 | 1.8 | 1.458 | 3.942 |
| 5 | 1.8 | 1.8 | 0.81 | 4.59 |
| 6 | 0.45 | 0.45 | 5.184 | 2.916 |

The properties of these polymers were measured in the same way as in Example 1. They showed high strength and high modulus. The results are shown in Table III together with those obtained in Example 1.

TABLE III

| Example | Tensile strength (kg/cm$^2$) | Flexural strength (kg/cm$^2$) | Flexural modulus (kg/cm$^2$) | Izod impact strength (notched) (kg-cm/cm) | Heat distortion temperature (under a load of 18.6 kg/cm$^2$) (°C.) | Melting point (°C.) | $\eta_{inh}$ |
|---|---|---|---|---|---|---|---|
| 1 | 2,350 | 2,890 | 1.9 × 10$^5$ | 28 | 142 | 287 | 3.2 |
| 3 | 1,880 | 2,450 | 1.4 × 10$^5$ | 26 | 134 | 284 | 3.6 |
| 4 | 2,230 | 2,140 | 1.7 × 10$^5$ | 27 | 125 | 288 | 3.5 |
| 5 | 2,220 | 2,180 | 1.3 × 10$^5$ | 30 | 127 | 276 | 3.1 |
| 6 | 2,010 | 2,110 | 1.4 × 10$^5$ | 28 | 112 | vague | 5.8 |

The polymers obtained in Examples 3 to 6, when observed under a polarizing microscope (Nikon PFX), showed optical anisotropy as did the polymer obtained in Example 1.

The polymer obtained in Example 6 was subjected to a Capillograph PMD-C (made by Toyo Seiki Seisakusho), and spun at 270° C. using a spinneret with an orifice diameter of 0.5 mm and a length of 5 mm to form an undrawn yarn having a diameter of 0.25 mm. The dynamic modulus of this yarn, measured by a Dynamic Modulus Tester made by Toyo Seiki Seisakusho, was as high as 168 GPa.

The relation between the temperatures and melt viscosities of the polymers obtained in Examples 5 and 6 were measured as in Example 1. The results are shown in FIG. 1.

EXAMPLE 1

A 5-liter three-necked separable flask equipped with a stirrer, a distillate condensing device and a nitrogen gas introducing opening was charged with 668.2 g (1.8 moles) of 1,2-bis(2-chlorophenoxy)ethane-4,4'-dicarboxylic acid, 486.5 g (1.8 moles) of 4,4'-biphenol diacetate, 1025.5 g (4.455 moles) of 6-acetoxy-2-naphthoic acid, 85.1 g (0.4725 mole) of 4-acetoxybenzoic acid, and 101.4 g (0.4725 mole) of 3-chloro-4-acetoxybenzoic acid, and the inside of the flask was purged three times with nitrogen. In a stream of nitrogen, the mixture was polymerized at 250° C. for 3 hours. Then, the temperature was raised, and the mixture was further polymerized at 280° C. for 1.5 hours, at 300° C. for 1.5 hours, at 310° C. for 1 hour and at 320° C. for 1 hour.

Then, the pressure was gradually reduced by using a water flow pump and in about 1 hour, decreased to about 30 torr. The pump was switched over to a vacuum pump, and the polymerization was carried out under about 1 torr for 2 hours.

The resulting polymer was lustrous and beige in color, and had an inherent viscosity of 3.5, a glass transition temperature of 132° C. and a melting point of 283° C.

The polymer was molded by an injection molding machine (PROMAT 165/75 made by Sumitomo Heavy Machinery Industry Co., Ltd.) into Dumbell specimens, flexural test specimens, etc., and their mechanical and thermal properties were measured. As shown below, it showed relatively high heat resistance, and high strength and modulus, especially excellent flexural properties.

Tensile strength: 1,940 kg/cm$^2$
Flexural strength: 3,140 kg/cm$^2$
Flexural modulus: 2.0×10$^5$ kg/cm$^2$
Izod impact strength: 37 kg-cm/cm.

EXAMPLE 8

Example 2 was repeated except that 1.8 moles of 1,2-bis(2-chlorophenoxy)ethane-4,4'-dicarboxylic acid for unit (I), 1.8 moles of methylhydroquinone diacetate for unit (II), 4.59 moles of p-hydroxybenzoic acid for unit (III) and 0.81 mole of 6-acetoxy-2-naphthoic acid for unit (IV) were used as starting compounds. The inherent viscosity, glass transition temperature, melting point and mechanical properties of the resulting copolyester were measured, and the results are shown below.

Tensile strength: 2,490 kg/cm$^2$
Flexural strength: 2,470 kg/cm$^2$
Flexural modulus: 1.7×10$^5$ kg/cm$^2$
Izod impact strength: 45.0 kg-cm/cm
Heat distortion temperature: 120.9° C.
Glass transition temperature: 118° C.
Melting point: 182° C.
Inherent viscosity: 2.8.

EXAMPLE 9

A 300 ml three-necked flask equipped with a stirrer, a distillate condensing device and a nitrogen gas introducing opening was charged with 37.1 g (0.1 mole) of 1,2-bis(2-chlorophenoxy)ethane-4,4'-dicarboxylic acid, 27.0 g (0.1 mole) of 4,4'-biphenol diacetate, 57.0 g (0.2475 mole) of 6-acetoxy-2-naphthoic acid and 11.0 g (0.0525 mole) of 2-methoxy-4-acetoxybenzoic acid (acetylvanillic acid). The mixture was polymerized by the same method as in Example 7.

The resulting polymer had an inherent viscosity of 4.0, a glass transition temperature of 133° C., and a melting point at 273° C.

EXAMPLE 10

A 300 ml three necked flask equipped with a stirrer, a distillate condensing device and a nitrogen gas introducing opening was charged with 17.9 g (0.05 mole) of 1,2-bis(2,6-dimethylphenoxy)ethane-4,4'-diacarboxylic acid, 13.5 g (0.05 mole) of biphenol diacetate, 38.7 g (0.168 mole) of 6-acetoxy-2-naphthoic acid and 41.8 g (0.232 mole) of p-acetoxybenzoic acid. The mixture was polymerized at 250°, 280° and 300° C. for 1 hour at each of the temperatures. Then, the temperature was gradually raised and in 30 minutes, brought to 320° C. Then, over the course of about 20 minutes, the inside pressure of the flask was reduced, and after the pressure fell below 1 torr, the polymerization was further conducted for 20 minutes to give a lustrous pale brown polymer.

The polymer had an inherent viscosity of 5.8, and a glass transition temperature of 99.5° C. Its melting point was broad and vague.

EXAMPLE 11

A 300 ml three-necked flask equipped with a stirrer, a distillate condensing device and a nitrogen gas introducing opening was charged with 37.1 g (0.1 mole) of 1,2-bis(2-chlorophenoxy)ethane-4,4'-dicarboxylic acid, 22.4 g (0.1 mole) of methoxyhydroquinone diacetate, 57.0 g (0.2475 mole) of 6-acetoxy-2-naphthoic acid and 9.5 g (0.0525 moles) of p-acetoxybenzoic acid, and the mixture was polymerized in the same way as in Example 1. There was obtained a lustrous brown polymer having an inherent viscosity of 3.0 and a glass transition temperature of 128° C. Its melting point was vague.

The polymer was extruded under a load of 10 kg/cm$^2$ at a temperature elevating rate of 3° C./min. from a narrow opening (diameter 0.5 mm; length 1 mm) using a flow tester (CFT-500 made by Shimazu Seizakusho). It began to flow at 255° C.

EXAMPLES 12-16

Example 11 was repeated except that each of the aromatic diols shown in Table IV was used in the same molar proportion. The inherent viscosities, glass transition temperatures and melting points of the resulting copolyesters are shown in Table IV. They showed sufficiently high glass transition temperatures, and those obtained in Examples 12 and 13 show especially high glass transition temperatures.

| Example | Unit (II) | inh | Glass transition temperature (°C.) | Melting point (°C.) |
|---|---|---|---|---|
| 12 | AcO—⌬—C(CH$_3$)$_2$—⌬—OAc | 2.0 | 151 | vague |
| 13 | AcO—⌬—SO$_2$—⌬—OAc | 1.8 | 159 | vague |
| 14 | AcO—⌬—O—⌬—OAc | 2.7 | 122 | vague |
| 15 | AcO—⌬—S—⌬—OAc | 1.7 | 123 | vague |
| 16 | AcO-naphthyl-OAc | 3.5 | 130 | 268 |

EXAMPLE 17

A 300 ml three-necked flask equipped with a stirrer, a distilate condensing device and a nitrogen introducing opening was charged with 50.1 g (0.135 mole) of 1,2-bis(2-chlorophenoxy)ethane-4,4'-dicarboxylic acid, 36.5 g (0.135 mole) of 4,4'-biphenol diacetate, 17.4 g (0.0756 mole) of 6-acetoxy-2-naphthoic acid, and 18.8 g (0.104 mole) of p-acetoxybenzoic acid, and the inside of the flask was purged with nitrogen three times. The mixture was first polymerized at 280° C. for 30 minutes, and then at 290° C. for 10 minutes and at 300+ C. for 10 minutes. Then, the temperature was elevated at 335° C. over 10 minutes, and the polymerization was carried out at this temperature for 10 minutes. The reaction system was then maintained under reduced pressure, and the polymerization was carried out under about 30 torr for 15 minutes and then under less than 1 torr for 10 minutes to give a lustrous beige polymer.

The resulting polymer had an inherent viscosity of 8.3 and a DSC melting point at 329° C.

EXAMPLE 18

A 300 ml three-necked flask equipped with a stirrer, a distillate condensing device and a nitrogen gas introducing opening was charged with 4.2 g (0.0113 mole) of 1,2-bis(2-chlorophenoxy)ethane-4,4'-dicarboxylic acid, 3.19 g (0.0115 mole) of 4,4'-biphenol diacetate, 63.0 g (0.274 mole) of 6-acetoxy-2-naphthoic acid and 27.7 g (0.154 mole) of p-acetoxybenzoic acid, and the mixture was subjected to polycondensation under the same conditions as in Example 1 except that in the second-stage polymerization under reduced pressure, the pressure was reduced to about 100 torr at 320° C. over the course of 30 minutes, and thereafter, the polymerization was carried out under 0.5 torr for 30 minutes. A lustrous beige non-transparent polymer was obtained.

The polymer had an inherent viscosity of 8.7 and a DSC melting point of 260° C.

EXAMPLE 19

A 300 ml three-necked flask equipped with a stirrer, a distillate condensing device and a nitrogen gas introducing opening was charged with 33.4 g (0.09 mole) of 1,2-bis(2-chlorophenoxy)ethane-4,4'-dicarboxylic acid, 24.3 g (0.09 mole) of 4,4'-biphenol diacetate and 48.7 g (0.27 mole) of p-acetoxybenzoic acid, and the inside of the flask was purged with nitrogen three times. At 260° C., the monomers were dissolved for 10 minutes, and then reacted at 250° C. for 2.5 hours. The temperature was then elevated, and the mixture was reacted further at 280° C. for 1.5 hours, at 290° C. for 1 hour, at 300° C. for 1 hour, and at 310° C. for 1 hour. Thereafter, at 310° C., the pressure was gradually reduced by a water flow pump, and finally to 100 torr in 30 minutes. The pressure was then reduced to 1 torr by a vacuum pump, and the reaction mixture was polymerized under this pressure for 1 hour to give a lustrous beige non-transparent polymer.

The polymer had an inherent viscosity of 13.0 and a DSC melting point of 298° C.

EXAMPLE 20

A 300 ml three-necked flask equipped with a stirrer, a distillate condensing device and a nitrogen gas introducing opening was charged with 33.4 g (0.09 mole) of 1,2-bis(2-chlorophenoxy)ethane-4,4'-dicarboxylic acid, 24.3 g (0.09 mole) of 4,4'-biphenol diacetate and 62.2 g (0.27 mole) of 6-acetoxy-2-naphthoic acid, and the inside of the flask was purged with nitrogen three times. At 280° C., the monomers were heated for 5 minutes to dissolve them, and then reacted at 265° C. for 55 minutes, and then at 280° C. for 30 minutes and at 300° C. for 5 minutes. The temperature was then elevated to 345° C. from 300° C., and the mixture was reacted further at 345° C. for 10 minutes. Thereafter, the pressure was gradually reduced by a vacuum pump, and the reaction mixture was polymerized under 0.5 torr for 10 minutes to give a lustrous beige non-transparent polymer.

The polymer had an inherent viscosity of 12.1 and a DSC melting point of 292° C.

What is claimed is:

1. A melt-processable copolyester composed of the following structural units (I), (II) and (III) and/or (IV) as main structural components, wherein unit (I) is represented by the formula

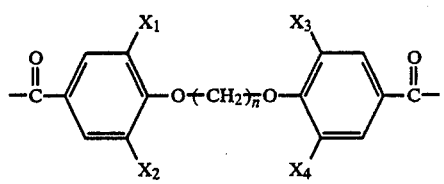

wherein $X_1$, $X_2$, $X_3$ and $X_4$, independently from each other, represent H, F, Cl, Br, $CH_3$ or $C(CH_3)_3$, provided that $X_1$ to $X_4$ do not simultaneously represent H, and n is 2 or 4, unit (II) is at least one unit selected from the group consisting of

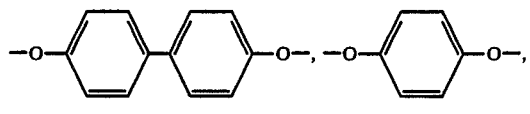

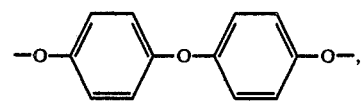

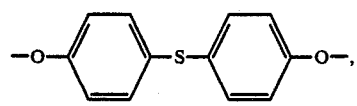

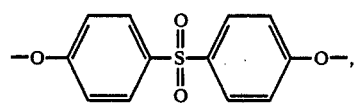

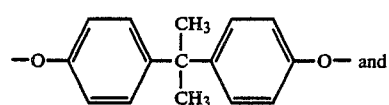

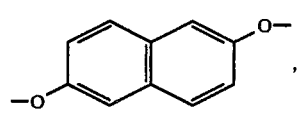

unit (III) is

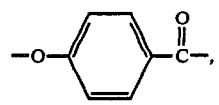

and unit (IV) is

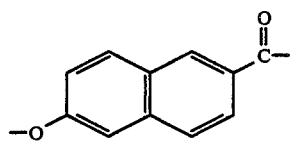

wherein at least one of the hydrogen atoms in each aromatic ring in units (II), (III) and (IV) may be substituted by an alkyl or alkoxy group having 1 to 4 carbon atoms or a halogen atom; and the proportion of unit (I) is 2.5 to 35 mole%, the proportion of unit (II) is 2.5 to 35 mole%, and the proportion of unit (III), (IV) or a combination of units (III) and (IV) is 30 to 95 mole%.

2. The copolyester of claim 1 which can be prepared by melt polymerization at a polymerization temperature of 140° to 320° C., and has an inherent viscosity, measured in pentafluorophenol at 60° C. in a polymer concentration of 0.1% by weight, of 1 to 15.

3. The copolyester of claim 1 which is obtained by polymerization at a polymerization temperature of 140° to 320° C. using an acylated monomer, or by acylation of the aromatic hydroxyl group followed by polycondensation.

4. The copolyester of claim 3 wherein the acylated monomer is an acetylated monomer.

5. A process for producing a melt-processable copolyester composed of the following structural units (I), (II) and (III) and/or (IV) as main structural components, wherein unit (I) is represented by the formula

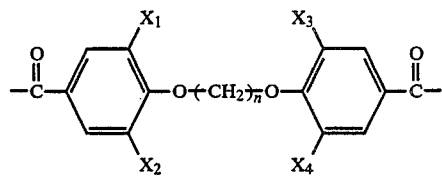

wherein $X_1$, $X_2$, $X_3$ and $X_4$, independently from each other, represent H, F, Cl, Br, $CH_3$ or $C(CH_3)_3$, provided that $X_1$ to $X_4$ do not simultaneously represent H, and n is 2 or 4, unit (II) is at least one unit selected from the group consisting of

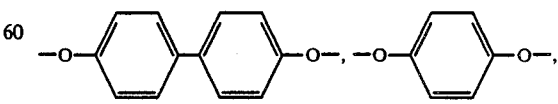

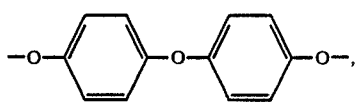

-continued

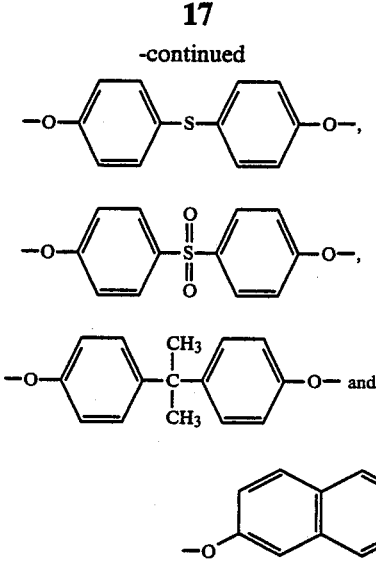

unit (III) is

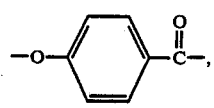

and unit (IV) is

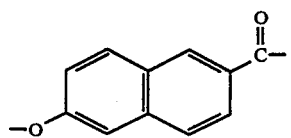

wherein at least one of the hydrogen atoms in each aromatic ring in units (II), (III) and (IV) may be substituted by an alkyl or alkoxy group having 1 to 4 carbon atoms or a halogen atom; and the proportion of unit (I) is 2.5 to 35 mole%, the proportion of unit (II) is 2.5 to 35 mole%, and the proportion of unit (III), (IV) or a combination of units (III) and (IV) is 30 to 95 mole%; which comprises copolymerizing a compound containing the structural unit (I), a compound containing the structural unit (II) and a compound containing the structural unit (III) and/or a compound containing the structural unit (IV).

6. The copolyester of claim 1 wherein the proportion of unit (I) is 10 to 25 mole%, the proportion of unit (II) is 10–25 mole% and the proportion of unit (III), (IV) or the combination of units (III) and (IV) is 50–80 mole%.

7. The copolyester of claim 1 which has a melt viscosity in the range of from $10^4$ to $10^2$ poises at a temperature of not more than 360° C. and not less than 180° C.

8. The copolyester of claim 1 wherein in the formula for unit (I) n is 4.

9. The copolyester of claim 1 wherein in the formula for unit (I) at least one of $X_1$, $X_2$, $X_3$ and $X_4$ represent $CH_3$ or $C(CH_3)_3$.

10. The copolyester of claim 1 wherein unit (II) is at least one unit selected from the group consisting of:

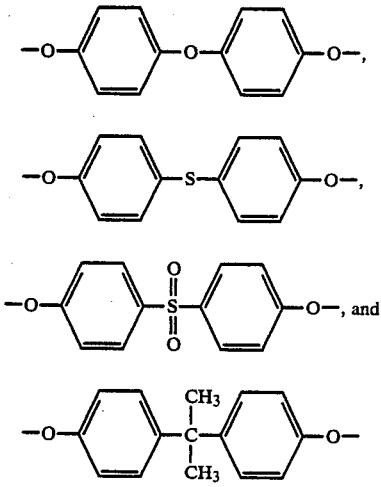

11. The copolyester of claim 1 wherein the structural units (III) are present.

12. The copolyester of claim 1 wherein the structural units (IV) are present.

13. The copolyester of claim 1 wherein both the structural units (III) and (IV) are present.

14. The copolyester of claim 13 wherein the unit (I) comprises structural units of 1,2-bis(2-chlorophenoxy)ethane-4,4'-dicarboxylic acid.

15. The copolyester of claim 14 wherein unit (II) is selected from the group consisting of:

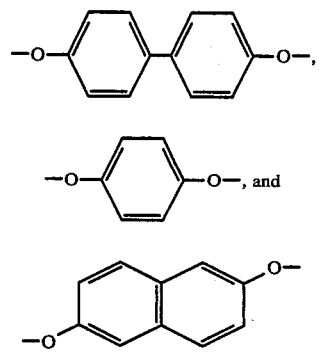

16. The copolyester of claim 1 having an inherent viscosity, measured in pentafluorophenol at 60° C. in a polymer concentration of 0.1% by weight, of from about 3 to about 6.

* * * * *